US012272898B2

(12) United States Patent
Keith et al.

(10) Patent No.: US 12,272,898 B2
(45) Date of Patent: Apr. 8, 2025

(54) TELECOMMUNICATIONS PATCH PANEL WITH ANGLED CONNECTOR MODULES

(71) Applicant: COMMSCOPE TECHNOLOGIES LLC, Hickory, NC (US)

(72) Inventors: Scott Martin Keith, Plano, TX (US); Craig Bryan Wilson, Oak Ridge, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 400 days.

(21) Appl. No.: 17/635,231

(22) PCT Filed: Aug. 13, 2020

(86) PCT No.: PCT/US2020/046223
§ 371 (c)(1),
(2) Date: Feb. 14, 2022

(87) PCT Pub. No.: WO2021/030614
PCT Pub. Date: Feb. 18, 2021

(65) Prior Publication Data

US 2022/0285877 A1 Sep. 8, 2022

Related U.S. Application Data

(60) Provisional application No. 62/886,807, filed on Aug. 14, 2019.

(51) Int. Cl.
*H01R 13/514* (2006.01)
*H01R 13/518* (2006.01)
(Continued)

(52) U.S. Cl.
CPC ......... *H01R 13/514* (2013.01); *H01R 13/518* (2013.01); *H01R 13/743* (2013.01); *H01R 24/64* (2013.01); *H01R 2107/00* (2013.01)

(58) Field of Classification Search
CPC .. H01R 13/514; H01R 13/518; H01R 13/743; H01R 2107/00; H01R 24/64
See application file for complete search history.

(56) References Cited

U.S. PATENT DOCUMENTS 4,244,144 A 1/1981 Goldberg et al.
5,639,261 A * 6/1997 Rutkowski ............. H04Q 1/142 439/31

(Continued)

FOREIGN PATENT DOCUMENTS

CN 203056165 U 7/2013
CN 108666794 A 10/2018
KR 10-1670889 B1 10/2016

OTHER PUBLICATIONS

International Search Report and Written Opinion of the International Searching Authority for International Patent Application No. PCT/US2020/046223 mailed Nov. 26, 2020, 10 pages.

*Primary Examiner* — Abdullah A Riyami
*Assistant Examiner* — Thang H Nguyen
(74) *Attorney, Agent, or Firm* — Merchant & Gould P.C.

(57) ABSTRACT

The present disclosure relates generally to a telecommunications patch panel comprising a connector module and a frame member. The connector module has a front face and an opposite facing rear face. The front face includes a connector jack for receiving a plug of a first conductive wire. The rear face includes a connection location for connecting to a second conductive wire. The connector module defines an axis of rotation generally parallel to the front face. The frame member has a front face and a plurality of tabs on the front face. The connector module is rotatably mounted to the frame member for movement about the rotation axis, and the plurality of tabs engage with the rear face of the connector module to prevent over-rotation of the connector module.

29 Claims, 13 Drawing Sheets

(51) Int. Cl.

| | |
|---|---|
| ***H01R 13/74*** | (2006.01) |
| ***H01R 24/64*** | (2011.01) |
| *H01R 107/00* | (2006.01) |

(56) References Cited

U.S. PATENT DOCUMENTS

| | | | | |
|---|---|---|---|---|
| 6,537,106 | B1 * | 3/2003 | Follingstad | H01R 13/748 439/534 |
| 6,916,199 | B2 * | 7/2005 | Follingstad | H01R 13/518 439/534 |
| 7,179,119 | B2 * | 2/2007 | Follingstad | H04Q 1/13 439/534 |
| 7,534,135 | B2 * | 5/2009 | Follingstad | H01R 24/64 439/534 |
| 7,544,090 | B2 * | 6/2009 | Follingstad | H01R 13/748 439/534 |
| 7,934,948 | B2 * | 5/2011 | Follingstad | H01R 13/518 439/534 |
| 8,187,027 | B2 * | 5/2012 | Follingstad | H01R 13/518 439/534 |
| 8,491,331 | B2 * | 7/2013 | Follingstad | H04Q 1/13 439/534 |
| 9,033,728 | B2 * | 5/2015 | Follingstad | H01R 24/64 439/534 |
| 9,356,384 | B2 * | 5/2016 | Follingstad | H01R 24/64 |
| 9,755,381 | B2 * | 9/2017 | Follingstad | H01R 35/04 |
| 2008/0096438 | A1 * | 4/2008 | Clark | H01R 13/518 439/713 |
| 2014/0038453 | A1 * | 2/2014 | Follingstad | H01R 13/518 439/534 |
| 2023/0335939 | A1 * | 10/2023 | Liu | H01R 13/6397 |

* cited by examiner

TELECOMMUNICATIONS PATCH PANEL WITH ANGLED CONNECTOR MODULES

CROSS-REFERENCE TO RELATED APPLICATION

This application is a National Stage Application of PCT/US2020/046223, filed Aug. 13, 2020, which claims the benefit of U.S. Patent Application Ser. No. 62/886,807, filed on Aug. 14, 2019, the disclosures of which is are incorporated herein by reference in their entireties. To the extent appropriate, a claim of priority is made to each of the above disclosed applications.

TECHNICAL FIELD

The present invention relates to a telecommunications connecting panel and, more particularly, to a cross-connect patch panel including a frame with jacks on one side and connection locations on an opposite side.

BACKGROUND OF THE INVENTION

Local area networks and telecommunications connections often use patch panels, especially at the customer's premises to enable cross-connection between telecommunications equipment. Patch panels typically include front and rear connection locations. The rear connections are typically a more permanent type of connection, such as insulation displacement connectors to connect to copper based, twisted pair telecommunications cable. The front connections of the patch panel may include any of a variety of jacks for receipt of a plug of a patch cord or other transmission cable. The jack and plug allows fairly rapid connection and disconnection between two jacks in the same patch panel, or between one jack in the patch panel and another jack in a nearby patch panel, with the patch cord. One type of jack and plug arrangement for a patch panel is an RJ45 type connector. U.S. Pat. No. 5,639,261 is an example of a cross-connect panel including rear insulation displacement connectors, and front connector jacks for receiving plugs of patch cords.

There is an increasing need for cable management in order to protect and organize the various cables. One area where damage and/or loss of performance may occur with copper based, twisted pair cables is when excessive bending of the cable occurs. This is especially a concern as higher frequencies are used, such as category 5 and greater. Falling below minimum bend radii of the cables can adversely affect performance with the transmission of signals through the copper wire patch cords. Therefore, there is a need for patch panels which address the cable management concerns noted above.

SUMMARY

One aspect of the present disclosure relates to a telecommunications patch panel comprising a connector module and a frame member. The connector module has a front face and an opposite facing rear face. The front face includes a connector jack for receiving a plug of a first conductive wire. The rear face includes a connection location for connecting to a second conductive wire. The connector module defines an axis of rotation generally parallel to the front face. The frame member has a front face, a rear face, and a plurality of tabs on the rear face. The connector module is rotatably mounted to the frame member for movement about the rotation axis, and the plurality of tabs engage with the rear face of the connector module to prevent over-rotation of the connector module.

Another aspect of the present disclosure relates to a telecommunications patch panel comprising a plurality of connector modules and a frame member. The plurality of connector modules each have a front face and an opposite facing rear face. The front face includes a connector jack for receiving a plug of a first conductive wire. The rear face includes a connection location for connecting to a second conductive wire. Each connector module defines an axis of rotation generally parallel to the front face. The frame member has a front face, a rear face, and a plurality of tabs on the rear face. Each connector module is rotatably mounted to the frame member for movement about the rotation axis, and the plurality of tabs engage with the rear face of the connector module to prevent over-rotation of the connector module.

In yet another aspect of the present disclosure, a telecommunications patch panel includes a connector module having a front face and an opposite facing rear face. The front face of the connector module includes a connector jack for receiving a plug of a first conductive wire. The rear face includes a connection location for connecting to a second conductive wire. The connector module has a latch arm on a top surface. The latch arm defines an axis of rotation generally parallel to the front face. The patch panel also includes a frame member having a front face, a rear face, and a mating hole on a top surface. The latch arm of the connector module is rotatably mounted to the frame member at the mating hole for movement about the rotation axis.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
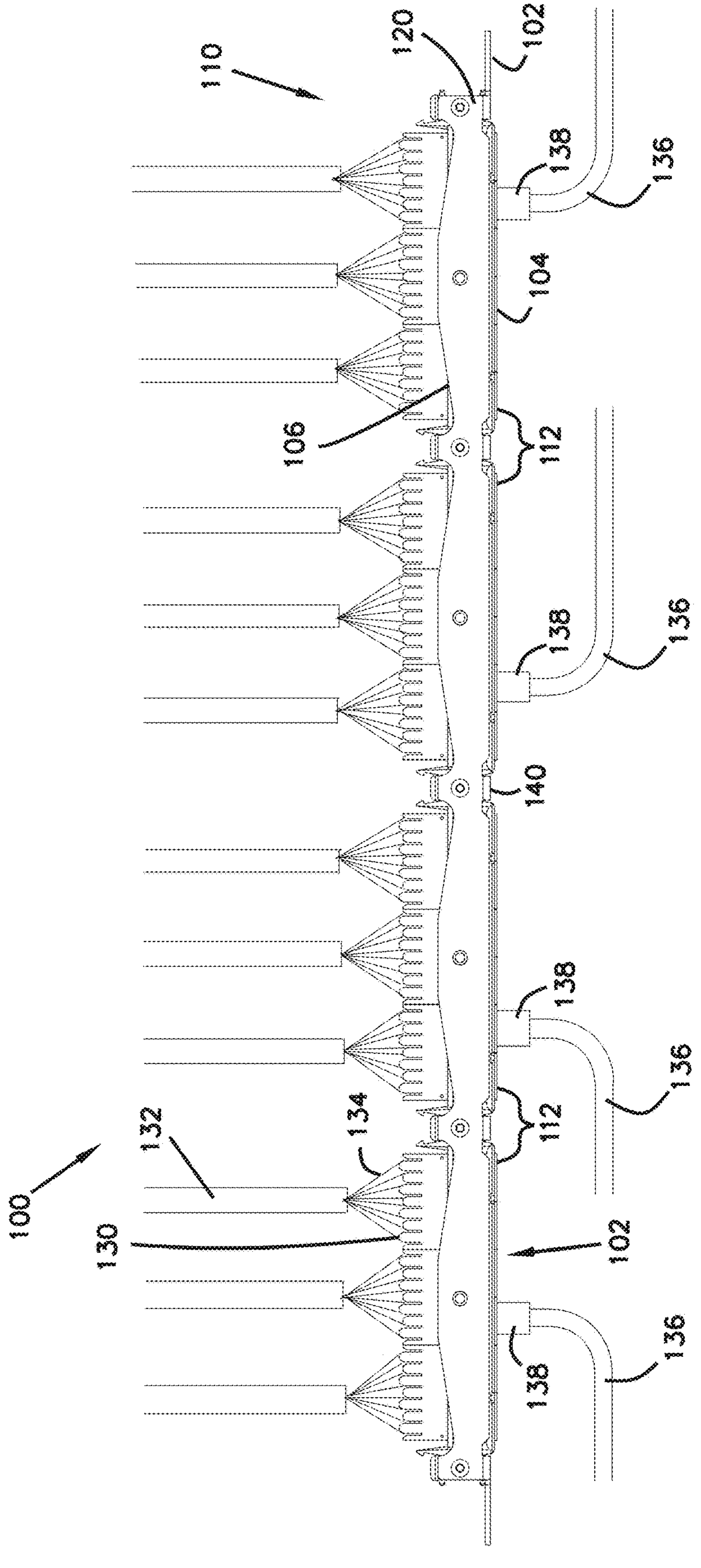
FIG. 1 is a top view of a patch panel, showing front and rear connections to cables.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Aspects of the present disclosure relate to communication patch panels that include at least one connector module and a frame member. In an embodiment, the frame member is capable of mounting a plurality of connector modules. The connector module includes a first and second latch arm that engage with a mating hole in the frame member, and allows the connector module to rotate about an axis of rotation. The frame member includes a plurality of tabs that prevent the connector modules from over rotation.

Figure 2:
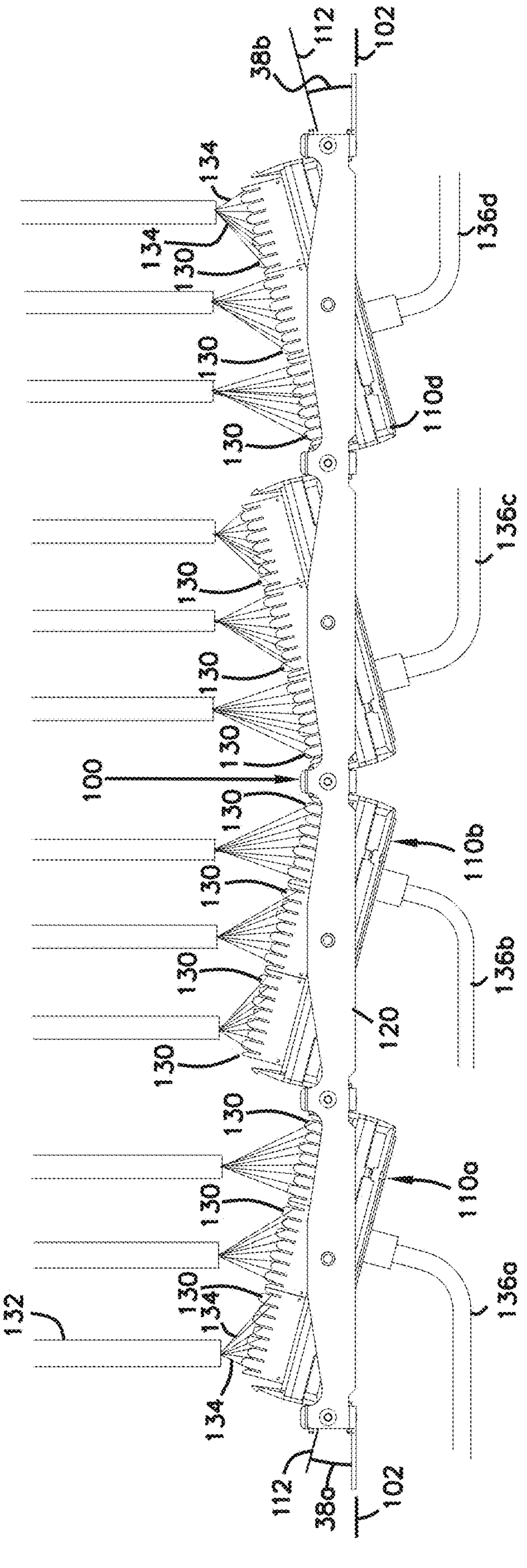
FIG. 2 is a top view of a patch panel when the connector modules are angled, showing front and rear connections to cables.

Referring generally to FIGS. 1 and 2, a patch panel 100 is illustrated for use in connecting telecommunications equipment. A patch panel 100 includes a frame member 120 and at least one connector module 110. The patch panel 100 is especially useful to cross-connect equipment through one or more of the patch panels 100 or other panels. The patch panel 100 mounts to a rack of conventional construction, such as with fasteners passing through holes of the frame member 120 for receipt in holes of the rack. The connector modules 110 include a plurality of connector jacks 104, such as RJ45 connector jacks, on a front face 112. The connector modules 110 further includes a plurality of connection locations 130, such as wire termination blocks or connection blocks mounted on an opposite rear face 114. Preferably, the connection location 130 including a plurality of termination blocks include 110-type insulation displacement connectors. Connection location 130 comprising termination blocks allow for connection of signal transmission cables 132, each containing a plurality of conductive wires 134. Connector jacks 104 allow for connection of signal transmission patch cables or cords 136 including conductive wires and further including connector end plugs 138. Circuitry electrically connects each connection location 130 comprising a termination block to a connector jack 104.

A patch panel 100 includes a plurality of connector modules 110, where each connector module 110 includes a plurality of connector jacks 104. The connector modules 110 of the patch panel 100 are arranged in a linear array in the frame member 120. Each connector module 110 includes a linear array of connector jacks 104. One linear array of connector jacks 104 is shown per connector module 110. Two or more arrays could be provided. Alternative embodiments include patch panels 100 with a single connector module 110. Also, each connector module 110 may be constructed with a single connector jack 104.

As shown in FIG. 2, each connector module 110 is capable of being mounted in an angled orientation relative to the frame member 120. Specifically, the frame member 120 includes a front side 102 and a rear side 106, and each connector module 110 includes a front face 112 where each front face 112 of the connector modules 110 is at an angle ***38a*/*38b* relative to the front side 102 of frame member 120. Connector modules 110 may be angled individually from one another. In the example shown, connector modules 110*a*, 110*b* are angled to the left of frame member 120, and connector modules 110*c*, 110*d* are angled to the right. Alternatively stated, connector modules 110*a*, 110*b* are angled clockwise, and connector modules 110*c*, 110*d* are angled counterclockwise, as viewed from the top of frame member 120 as depicted in FIG. 2. If patch panel 100 is oriented vertically, then connector modules 110*a*, 110*b* would be angled upwardly (or downwardly), and connector modules 110*c*, 110*d*** would be angled downwardly (or upwardly).

In the illustrated embodiment, the angle of displacement of each connector module 110 relative to frame member 120 is about 15 degrees. In the case of patch cords **136*a*, 136*b* angled to the left, and patch cords 136*c*, 136*d* angled to the right, such an angle provides strain relief so as to help prevent cable damage and/or loss of cable performance. The cable positioning provided by the angled connector modules 110** helps reduce the likelihood of falling below the minimum bend radius of the cable as each cable travels to other jacks or other equipment. Such strain relief is advantageous over a perpendicular mounting of the connector plug relative to the cable pathway.

In FIG. 2 the cables 132 are shown as being directed away from patch panel 100. It is to be noted that the opposite ends of the cables 132 can be connected to other connector jacks 104 of the patch panel 100. The patch panel 100 is useable in both cross-connect systems, and in inter-connect systems, as desired. Providing strain relief so as to not fall below minimum bend radii is also an issue with fiber optic transmission cables. The telecommunications patch panel 100 of the present invention is also useful in fiber applications with appropriately configured fiber optic connectors.

As shown in FIG. 2, the connector modules 110*a*, 110*b*, 110*c*, 110*d* can be rotated to the left or rotated to the right. One or more connector modules 110*a*, 110*b*, 110*c*, 110*d* can be left or locked in the positions shown in FIG. 2 or 4, if desired. To maintain the connector modules 110 in the rotated positions, a lock 140 is actuated. If desired, one or more of the connector modules 110 and the frame member 120 can be constructed in a permanently angled configuration relative to the front side 102 of the frame member 120.

The connector modules 110 are positionable in one of three selectable positions. A first position is where the front face 112 of the connector module 110 is generally parallel to the front side 102 of the frame member 120. A first angled position is where the front face 112 of the connector module 110 is at a first angle relative to the front side 102 of the frame member 120. A second angled position is where the front face 112 of the connector module 110 is at a second angle relative to the front side 102 of the frame member 120. The second angle is opposite the first angle.

In the embodiment shown, the connector module 110 show a six pack distribution module design comprising connector jacks that are mounted to a common printed circuit board. In alternative embodiments the connector modules 110 may be used in a discrete distribution module, where the connector your module is a plastic housing that allows for discrete jacks for couplers to be installed.

Figure 3:
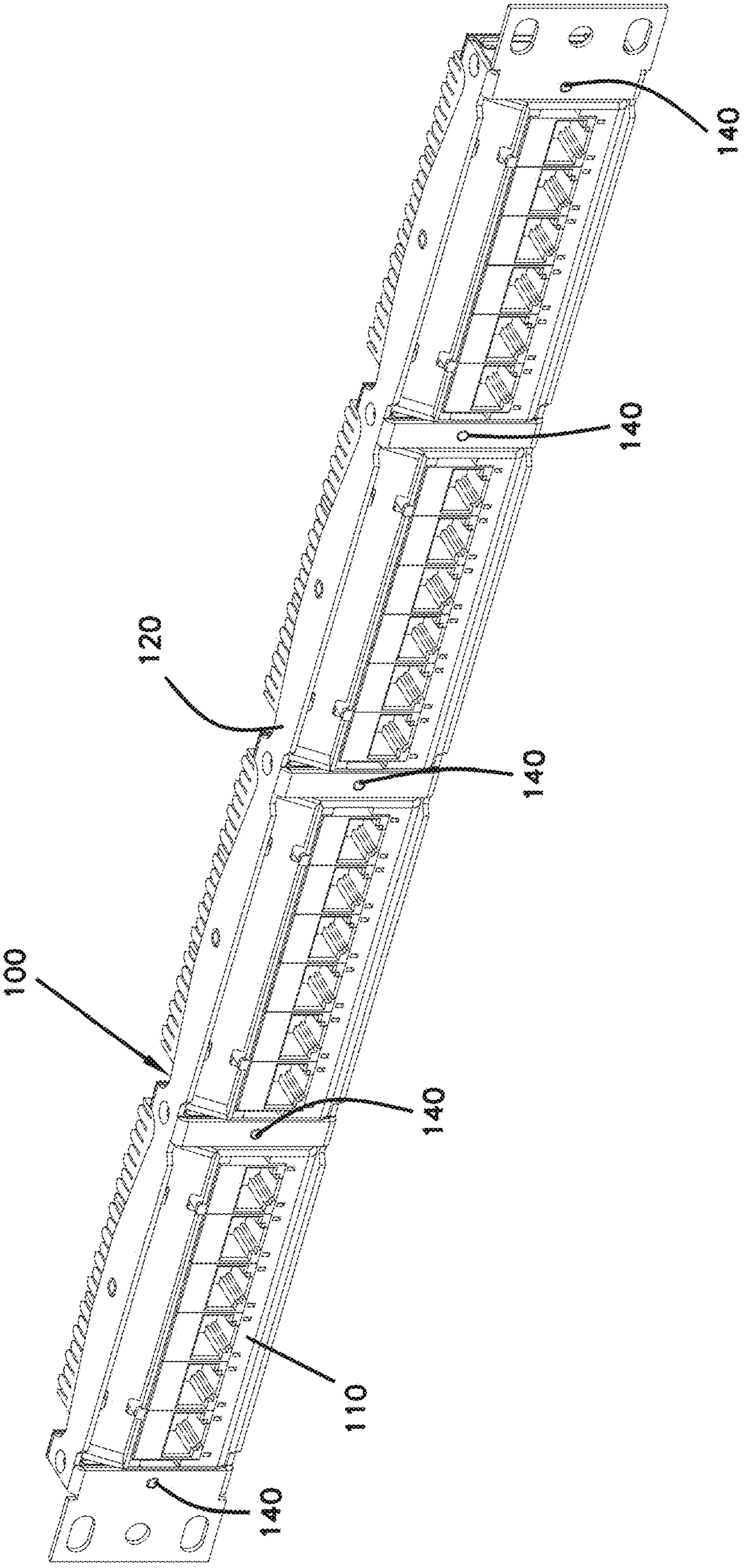
FIG. 3 is a perspective view of the patch panel, showing all of the connector modules extending parallel to the frame.

FIG. 3 illustrates connector modules 110 that are rotatable relative to the frame member 120. Each connector module 110 has its front face 112 positioned generally parallel to the front side 102 of the frame member 120. Such an arrangement is useful when using a termination tool (not shown) to mount wires (not shown) to each of the connection locations 130 in the case of insulation displacement connectors. A lock 140 is releasable to allow rotation of each connector module 110 as desired.

The lock 140 is located on the frame member 120, and includes at least one lock 140 per connector module 110. When the lock 140 is not engaged, each connector module 110 is positionable to the left (fully or partially), to the right (fully or partially) or parallel as desired. For connector modules 110 which are freely rotatable, the connector modules 110 may move to a new position from an original position to provide the strain relief, as the patch cords 136 are added or changed.

Figure 4:
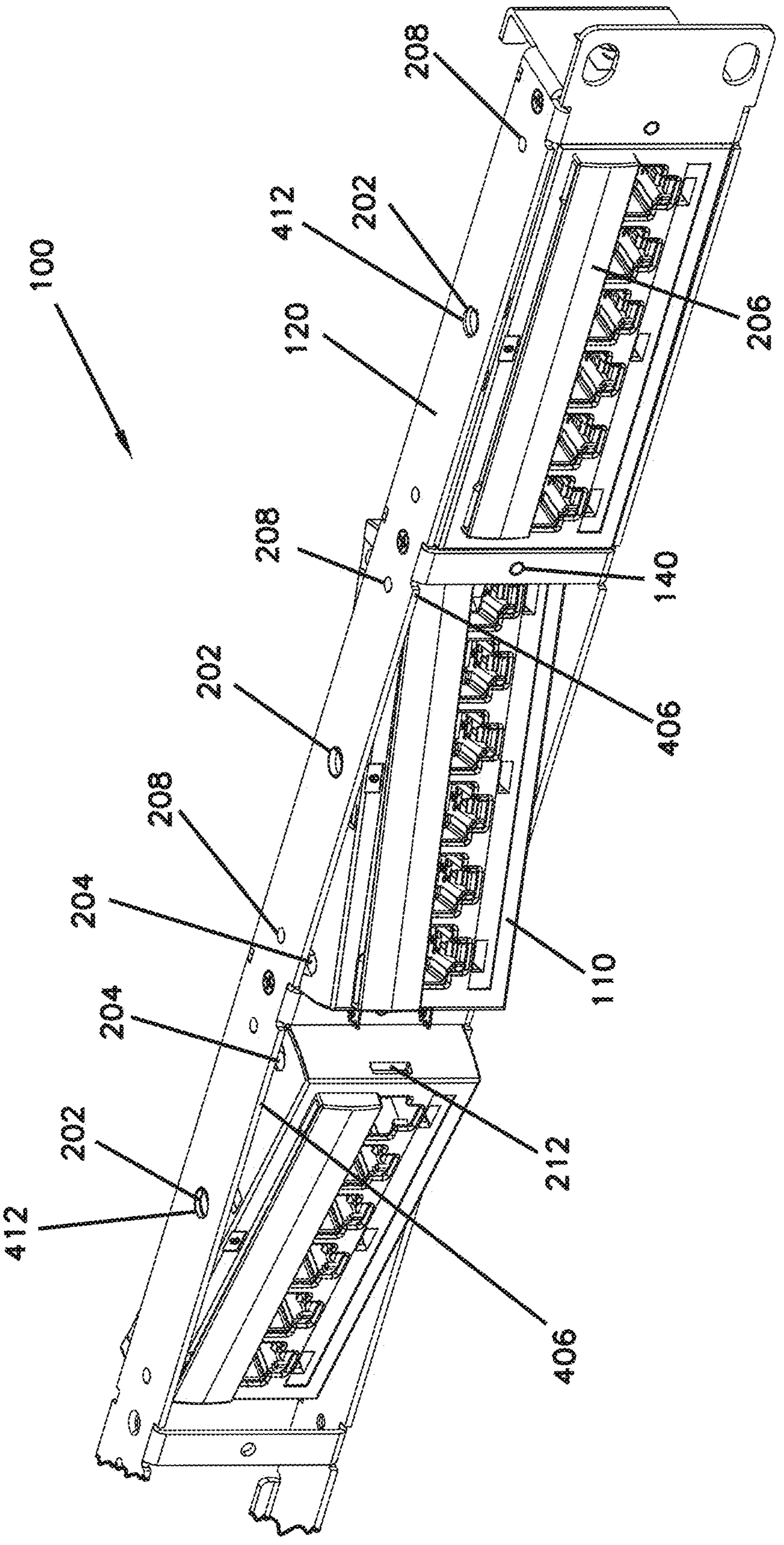
FIG. 4 is a perspective view of the patch panel, showing the connector modules angled relative to the frame.

As shown in FIG. 4, each of the connector modules 110 may be rotated in a different direction. The connector modules 110 are rotatable about a rotation axis located at the latch arm 202. Each of the connector modules 110 includes at least one latch arm 202 extending to the patch panel 100 at the rotational axis. For example, the connector module 110 includes a first latch arm 202 on a top and a second latch arm 202 on a bottom. In an embodiment, the latch arm 202 extends within a mating hole 412 of the frame member 120. In another embodiment, the latch arm 202 extends through the mating hole 412 of the frame member 120.

Each of the connector modules 110 also include a plurality of protrusions 204. In an example embodiment, the plurality of protrusions 204 are located on a top surface 402 of the connector modules 110. In another embodiment, the plurality of protrusions 204 are located on a top surface 402 and a bottom surface 404 on opposing ends of the connector modules 110. The plurality of protrusions 204 are capable of maintaining the connector module 110 in one of the three selectable positions: parallel, a first angle, or an opposing second angle. For example, when the connector module 110 is in the parallel position, all of the protrusions 204 are engaged with the frame member 120. The protrusions 204 are also configured to abut against a top front edge 406 of the frame member 120, when the connector modules 110 are in an angled position.

The front side of the connector module 110 also includes a cover panel 206. The cover panel 206 snaps into the connector module 110 to cover openings (not shown). Openings are described in more detail below.

The latch arm 202 provides a snap-fit, friction-fit, or other similar mechanical engagement of the connector module 110 to the frame member 120. The latch arm 202 allows for easy removal of a connector module 110 from the frame member 120, if needed. In an example, if the patch panel 100 is mounted to a rack, a connector module 110 can be easily removed from the front side 102 of the frame member 120.

A lock receptacle 212 is located on at least one side of the connector module 110. The lock receptacle 212 is configured to communicate with the lock (not shown) to lock the connector module 110 in a fixed position. The locking mechanism is described in more detail below.

Figure 5:
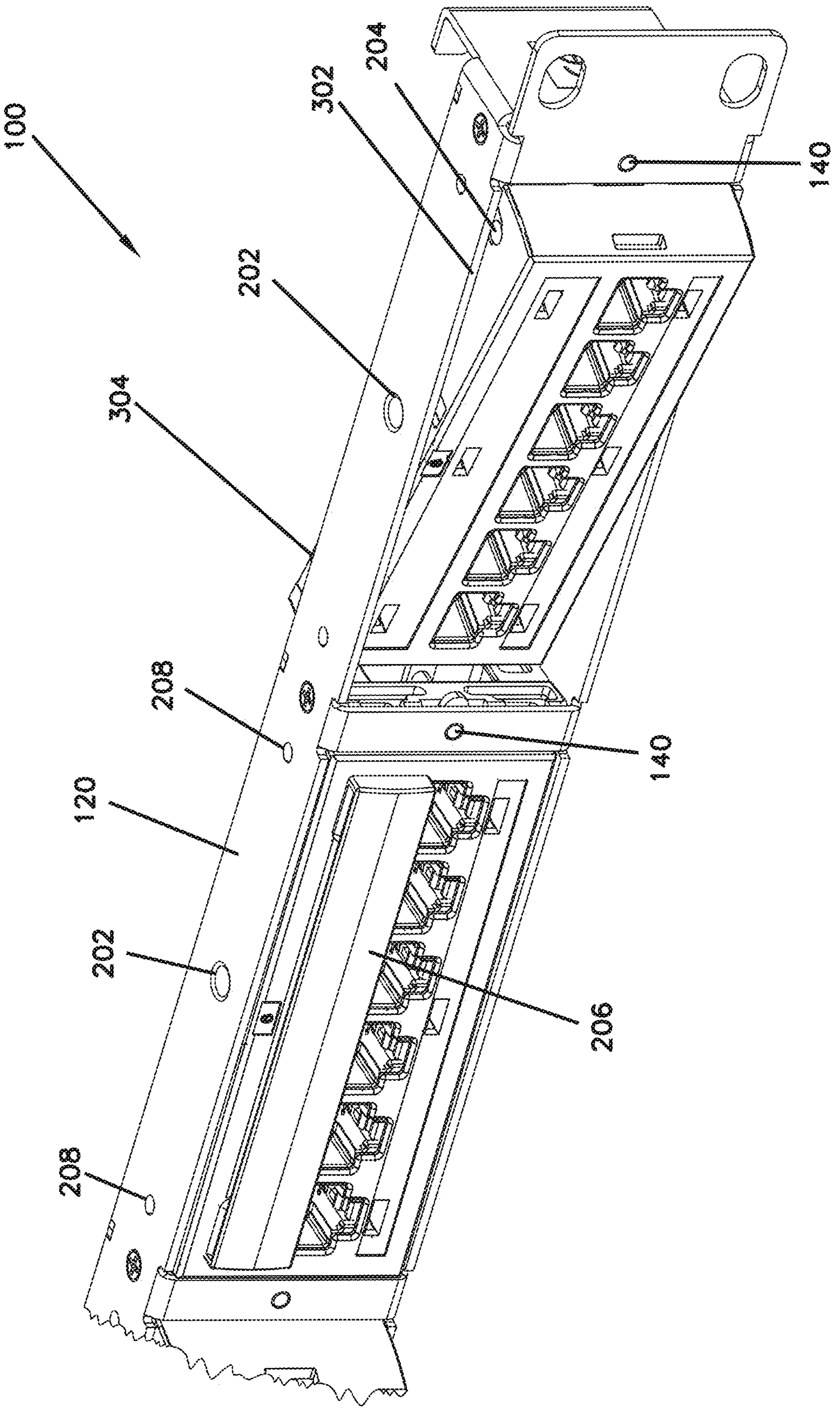
FIG. 5 illustrates a more detailed view of the embodiment of FIG. 4.

FIG. 5 illustrates a close-up view of the patch panel 100 comprising a plurality of connector modules 110 mounted in the frame member 120. As described above, each of the connector modules 110 comprises a latch arm 202 that extends to the frame member 120 that maintains the connector module 110 within the frame member 120. Also, each of the connector modules 110 includes a plurality of protrusions 204 that engage a protrusion engagement portion 208 located on the frame member 120. In an embodiment of a connector module 110 at an angled position, the protrusions 204 are biased against a front side edge 302 of the frame member 120. Although not shown, an opposing protrusion 204 is biased against a rear side edge 304.

A lock 140 is used to fix the position of the connector module 110 within the frame member 120. When the lock 140 is in a neutral position, the connector modules 110 are freely rotatable. When the lock 140 is rotated 90° from the neutral position, the connector modules 110 are locked in place relative to the frame member 120.

Figure 6:
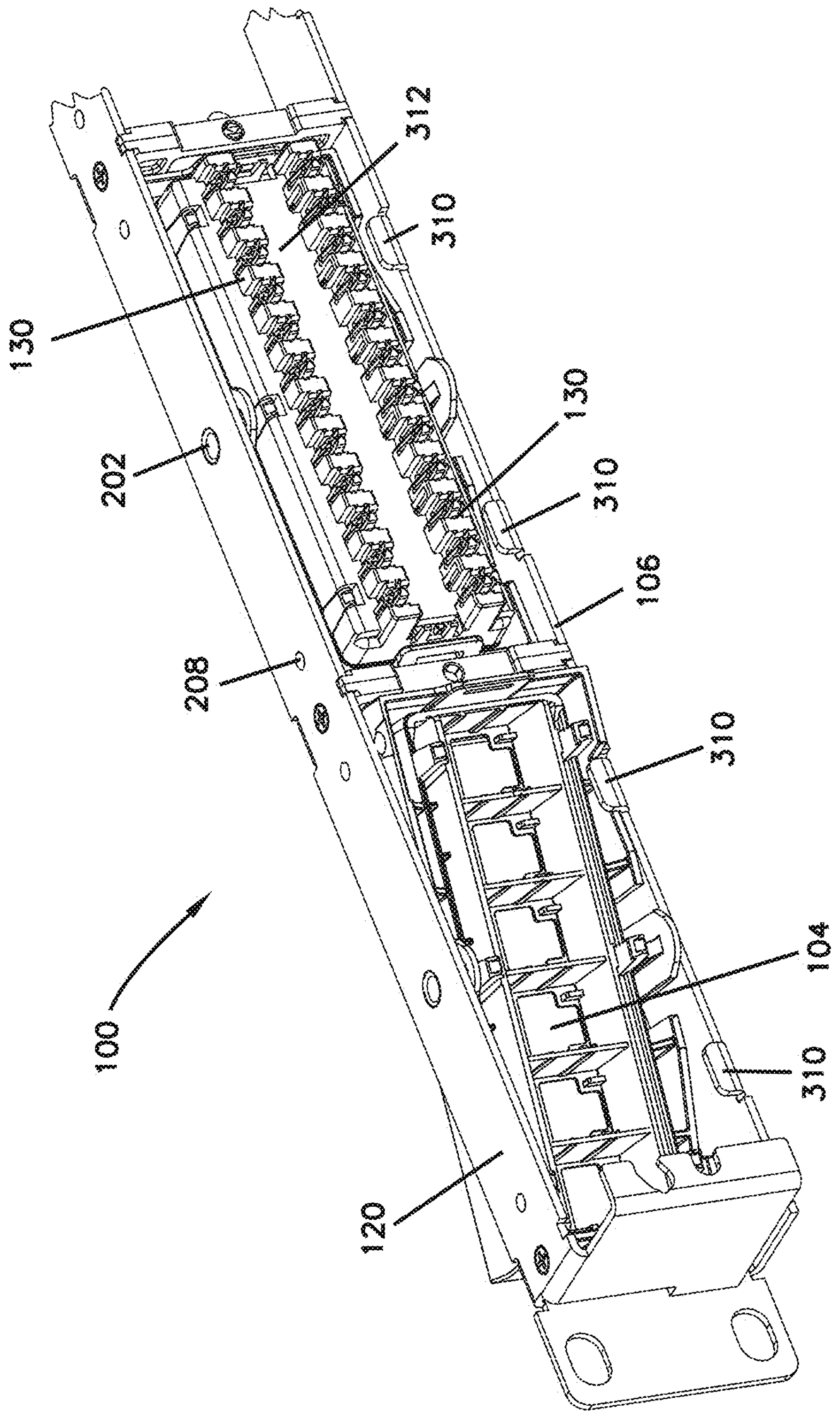
FIG. 6 illustrates a rear view of the patch panel.

FIG. 6 illustrates a view from the back side of the patch panel 100 including a plurality of connector modules 110 mounted in the frame member 120. Each of the connector modules 110 includes a plurality of connection locations 130. In an embodiment, the back side of the connector modules 110 includes a set of plug receptacles for a "feed through" style module. In another embodiment, the connection locations 130 are located on a connector panel 312 that is removable. The connector panel 312 communicates with the connector jacks 104 and allows for communication with optical fibers and/or copper wires.

The frame member 120 also includes a plurality of tabs 310 located on a rear side 106. As shown, the tabs 310 are located offset from the rotational axis for each connector module 110. The tabs 310 extend upward from the base of the patch panel 100. The tabs 310 prevent the connector modules 110 from over rotating. For example, when the connector modules 110 are rotated, a rear face 114 of the connector module 110 comes into contact with the tabs 310, so the connector module 110 cannot be further rotated.

Figure 7:
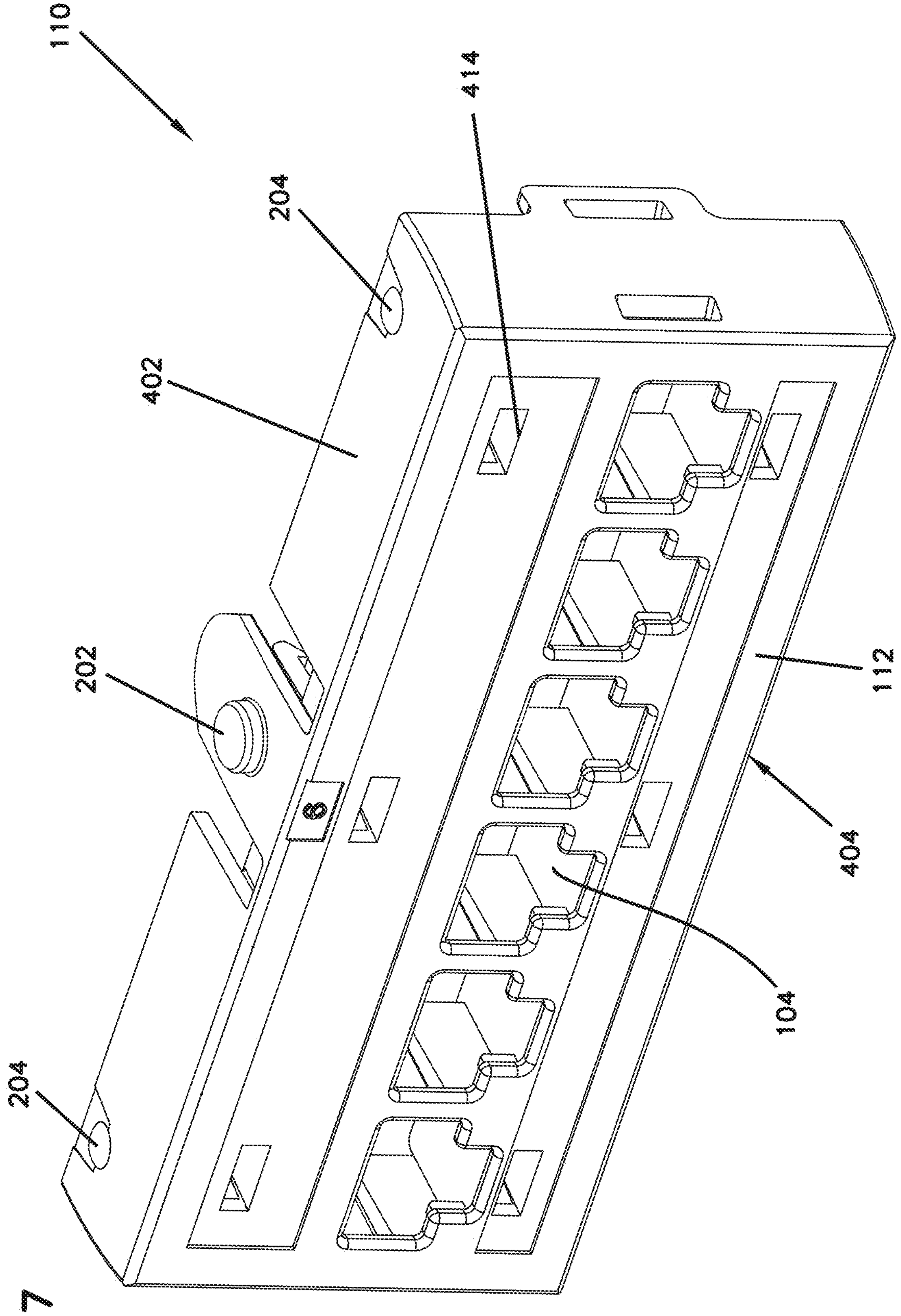
FIG. 7 illustrates an isolated view of the front side of a connector module.

FIG. 7 shows an isolated view of a connector module 110. Each connector module 110 includes a latch arm 202 that extends from a middle of the top surface 402 and defines the rotational axis. Each connector module 110 also includes a plurality of protrusions 204 extending up from the top surface 402. For example, a first protrusion 204 extends at a first end of the connector module 110 and a second protrusion 204 extends at a second end of the connector module 110. Although not shown, a latch arm 202 can extend from the bottom surface 404 of the connector module 110. In a further embodiment, a plurality of protrusions 204 can also extend from the bottom surface 404.

The protrusions 204 are also configured to abut against a top front edge 406 of the frame member 120, when the connector modules 110 are in an angled position.

The connector module 110 also includes a plurality of opening 414 that allow a user to remove a connector module 110 from the frame member 120 from a front side. Also shown are the connector jacks 104 for connection of signal transmission patch cables or cords 136.

Figure 8:
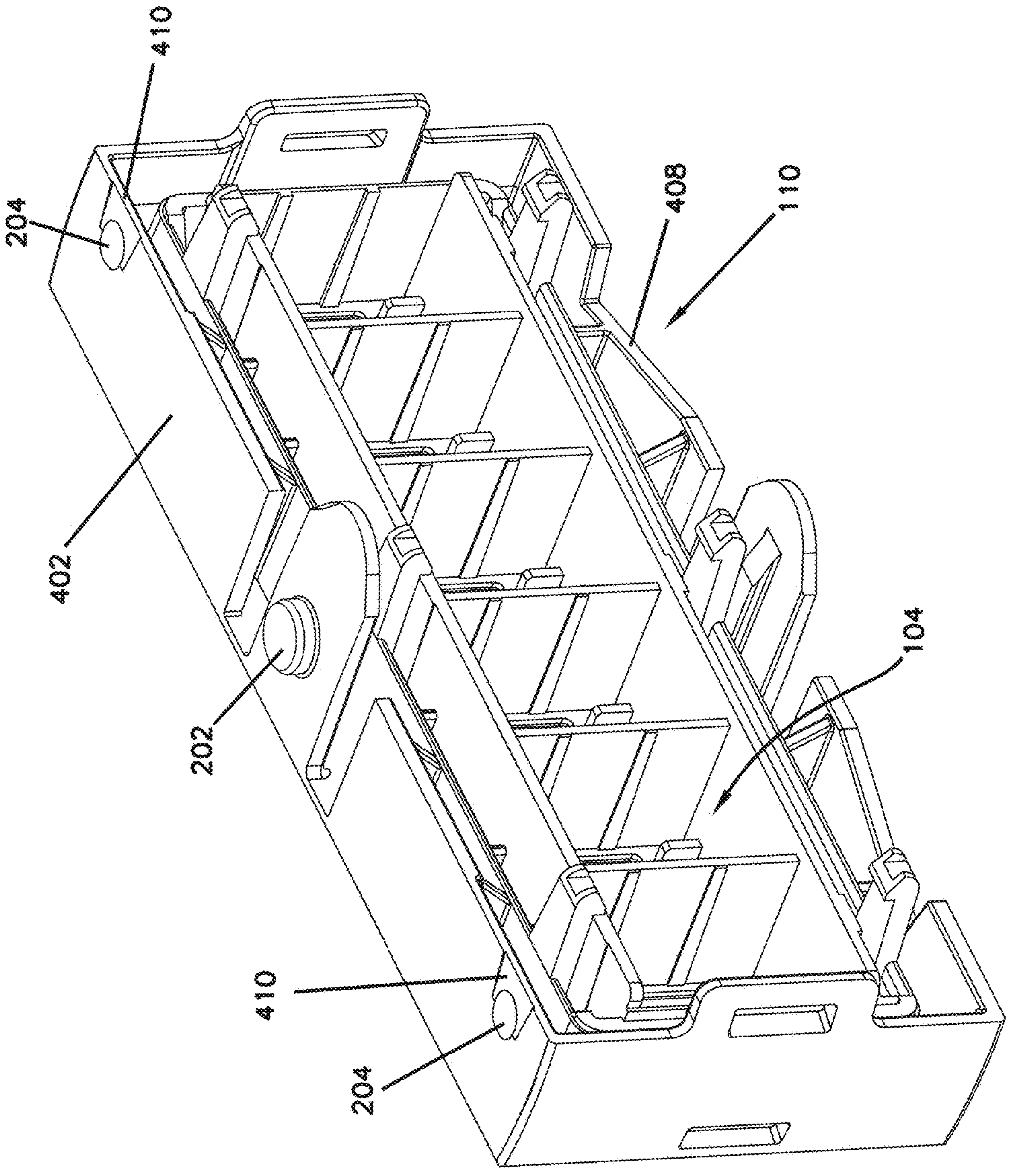
FIG. 8 illustrates an isolated view of the rear side of a connector module.

FIG. 8 shows an isolated view of the rear side 106 of the connector module 110. The connector panel 312 is removed, and the connector jacks 104 are shown. As described above, the rear side of the connector module 110 may also include a set of connector jacks 104 that allow for a "feed-through" style connector module 110.

The protrusions 204 are shown extending up from the top surface 402. In an embodiment, the protrusions 204 are located on a flexible tab 410. The flexible tab 410 allows the protrusions 204 to enter the protrusion engagement portion 208 when the connector module 110 is rotated. The strength of the flexible tab 410 can be overcome by a user who is changing the angle of the connector module 110, but great enough to maintain the protrusion 204 in the protrusion engagement portion 208 without outside force.

The rear bottom edge 408 of the connector modules 110 come into contact with the tabs (not shown) of the frame member (not shown). The height of the tabs is greater than the height of the rear bottom edge 408.

Figure 9:
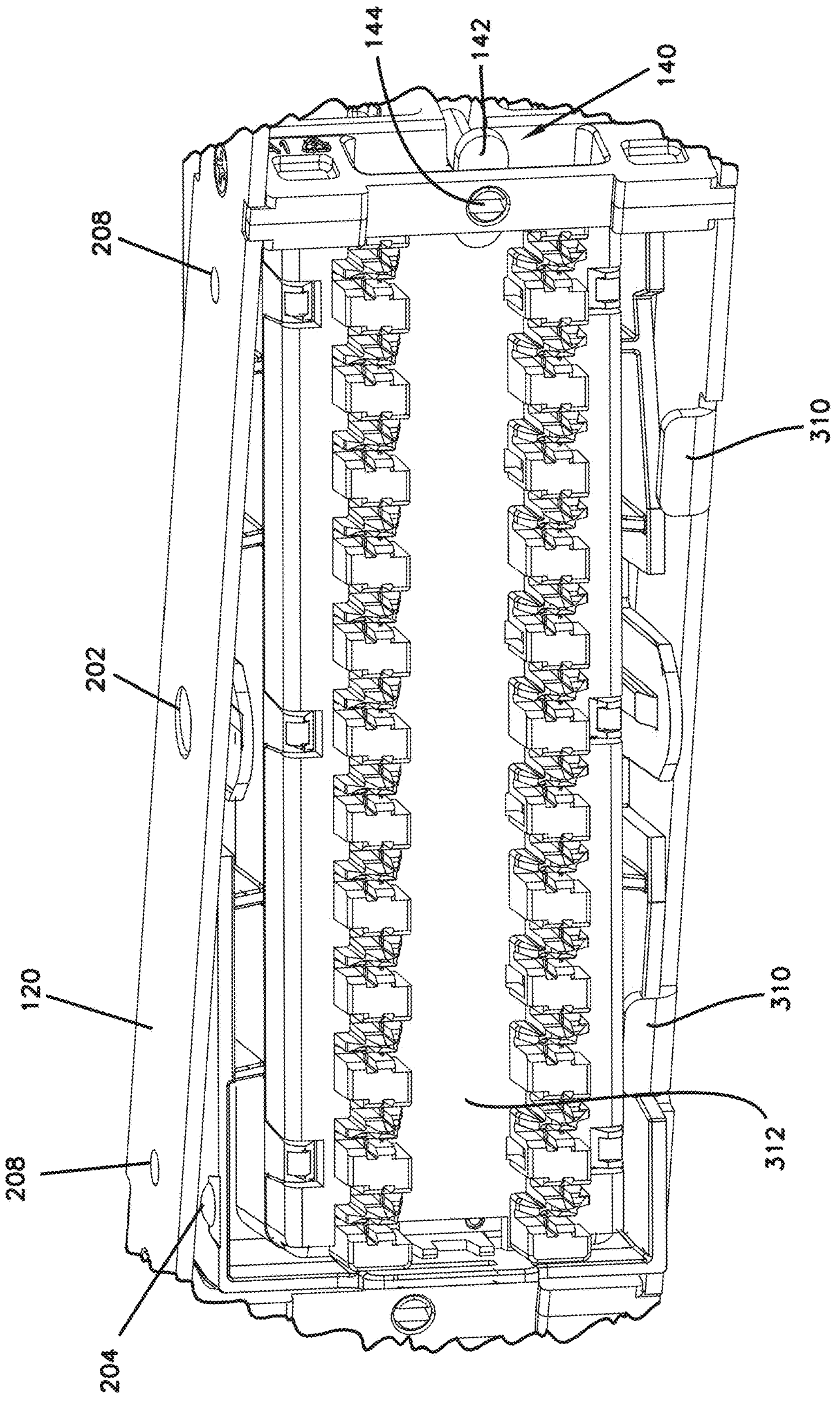
FIG. 9 illustrates a rear view of the patch panel.

FIG. 9 illustrates an isolated view of the rear side of the connector module 110 in the frame member 120 with the connector panel 312 attached. The connector panel 312 allows for the communication with the connector jacks 104 for communication with optical fibers and/or copper wires.

The frame member 120 includes a plurality of tabs 310 located on a rear side 106. As shown, the tabs 310 are located offset from the rotational axis for each connector module 110. The tabs 310 extend upward from the base of the patch panel 100. The tabs 310 prevent the connector modules 110 from over rotating. For example, when the connector modules 110 are rotated, a rear face 114 of the connector module 110 comes into contact with the tabs 310, so the connector module 110 cannot be further rotated.

The protrusion 204 is biased against a rear side edge of the frame member 120, which maintains the connector module 110 in a rotated position. The lock 140 fixes the position of the connector module 110 within the frame member 120. In the embodiment shown, the lock 140 is rotated 90° from the neutral position, so the connector module 110 is locked in place relative to the frame member 120. The lock 140 comprises a locking cam 142 and a lock actuator 144.

Figure 10:
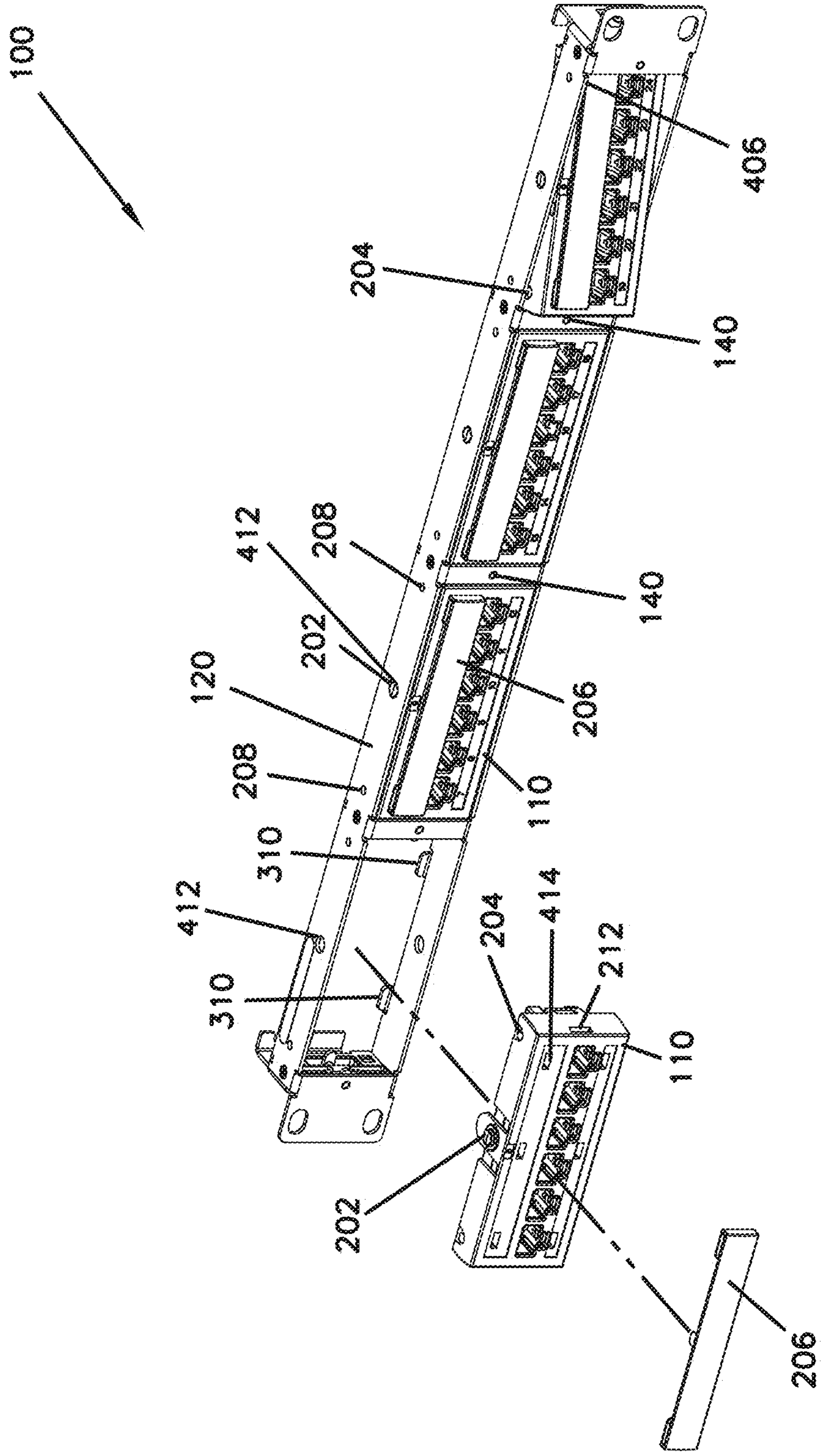
FIG. 10 illustrates an exploded view of a connection module in a frame member.

FIG. 10 shows an exploded view of a connector module 110 and the frame member 120. The connector module 110 includes the cover panel 206 removed and the plurality of opening 414 shown. The cover panel 206 snaps into the connector module 110, by for example, a friction fit.

Figure 11:
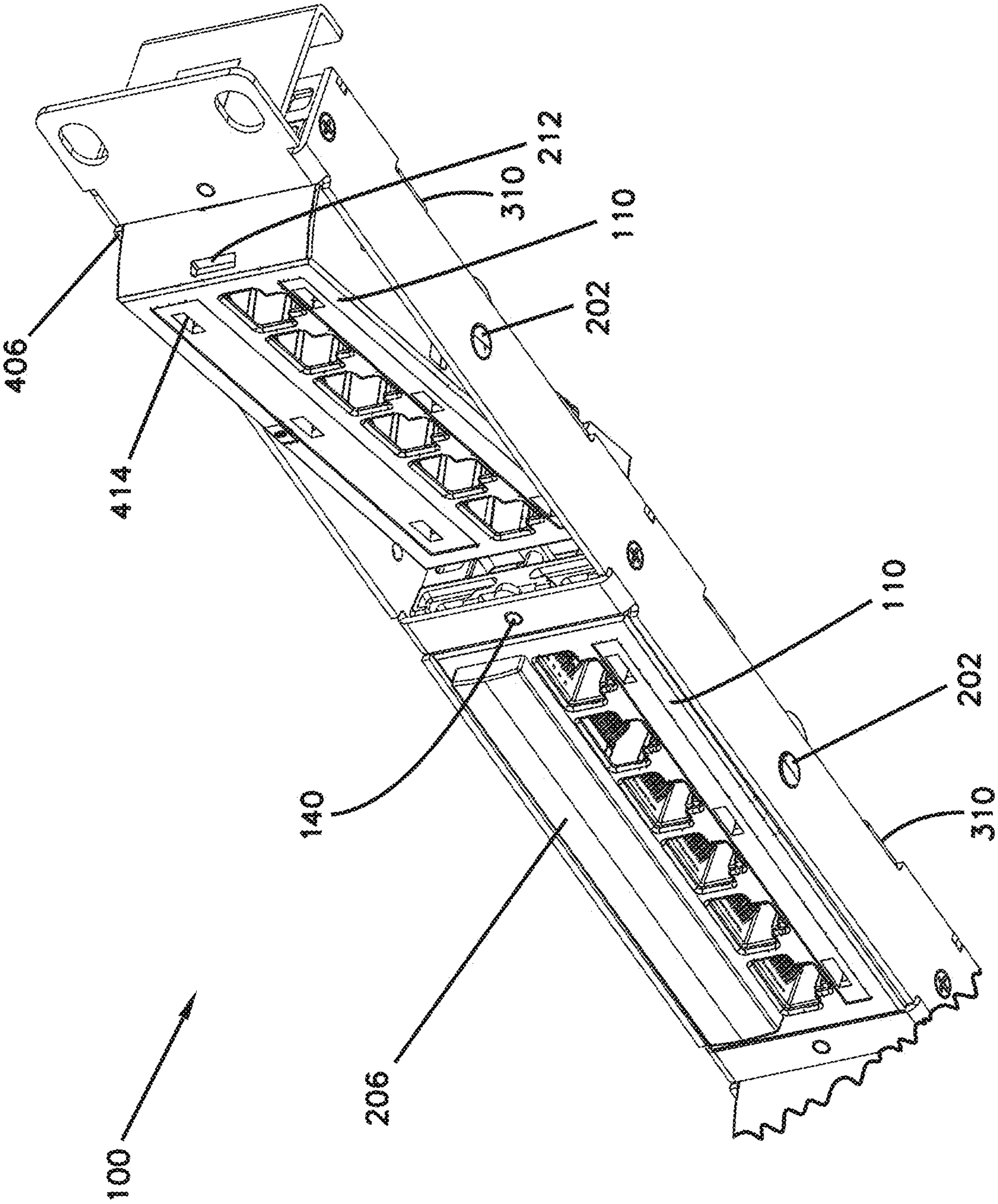
FIG. 11 illustrates a bottom view of the patch panel.

FIG. 11 illustrates a view of the bottom of the patch panel 100 comprising a plurality of connector modules 110 mounted in the frame member 120. Each of the connector modules 110 comprises a latch arm 202 that extends to the frame member 120 to maintain the connector module 110 within the frame member 120. The lock receptacle 212 is located on at least one side of the connector module 110 and is configured to communicate with lock 140.

Figure 12:
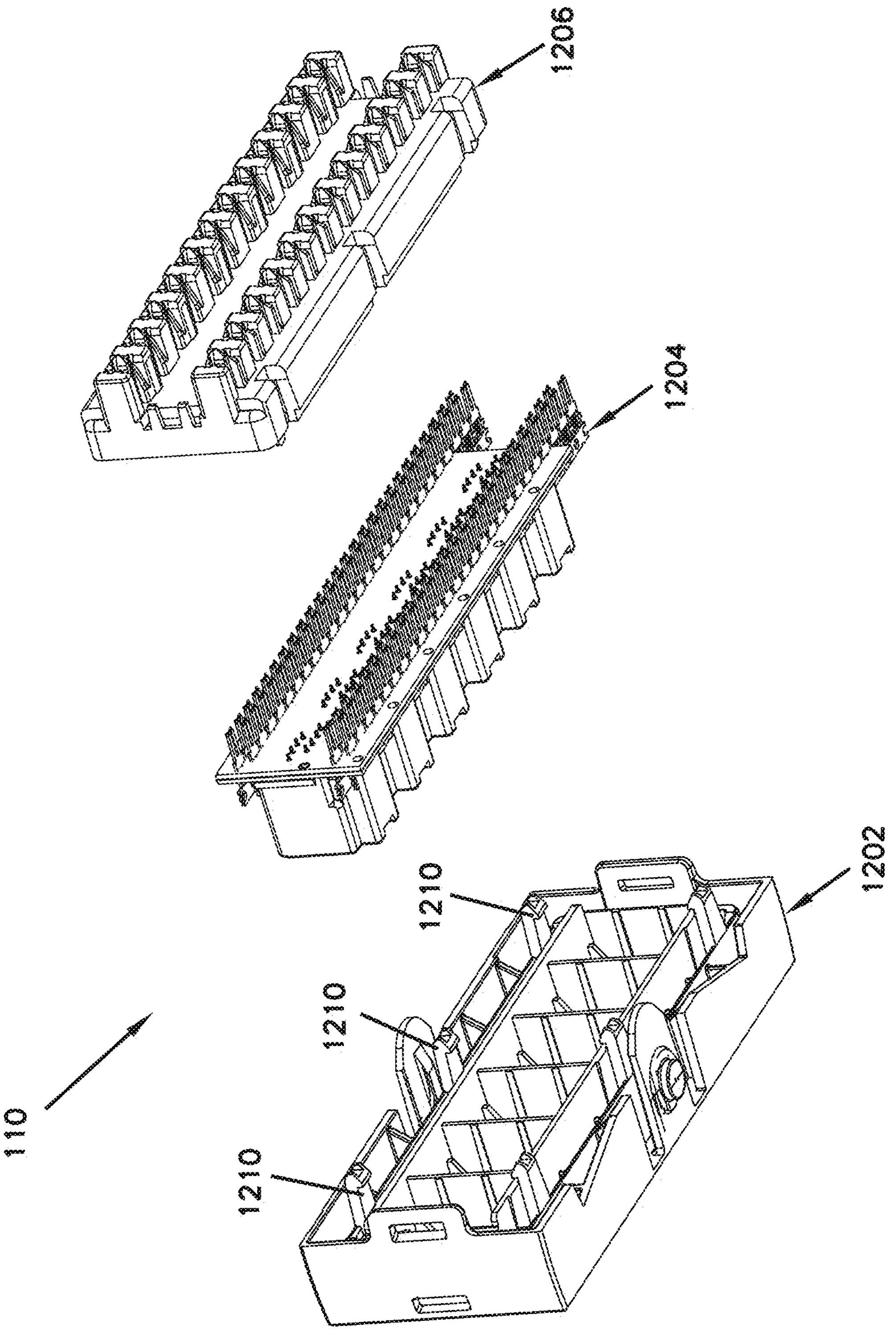
FIG. 12 illustrates an exploded view of a connector module.

FIG. 12 illustrates an exploded view of the connector module 110. The connector module includes a first piece 1202, a second piece 1204, and third piece 1206. The first piece 1202 is the front facing portion of the connector module 110 that includes, in an example, connector jacks. The first piece 1202 includes a plurality of connecting mechanisms 1210. The connecting mechanisms 1210 are configured to communicate with the third piece 1206. In an assembled embodiment, the second piece 1204 is maintained in position between the first piece 1202 and the third piece 1206.

In an example embodiment, the first piece 1202 is a plurality of connection jacks, such as a six pack distribution design. The second piece 1204 may be a printed circuit board, and the third piece 1206 prizes a plurality of connection locations, such as to individual wires. However, this is not to be seen as limiting, as the second piece 1204 and the third piece 1206 may also comprise connection jacks for a pass through embodiment.

Figure 13:
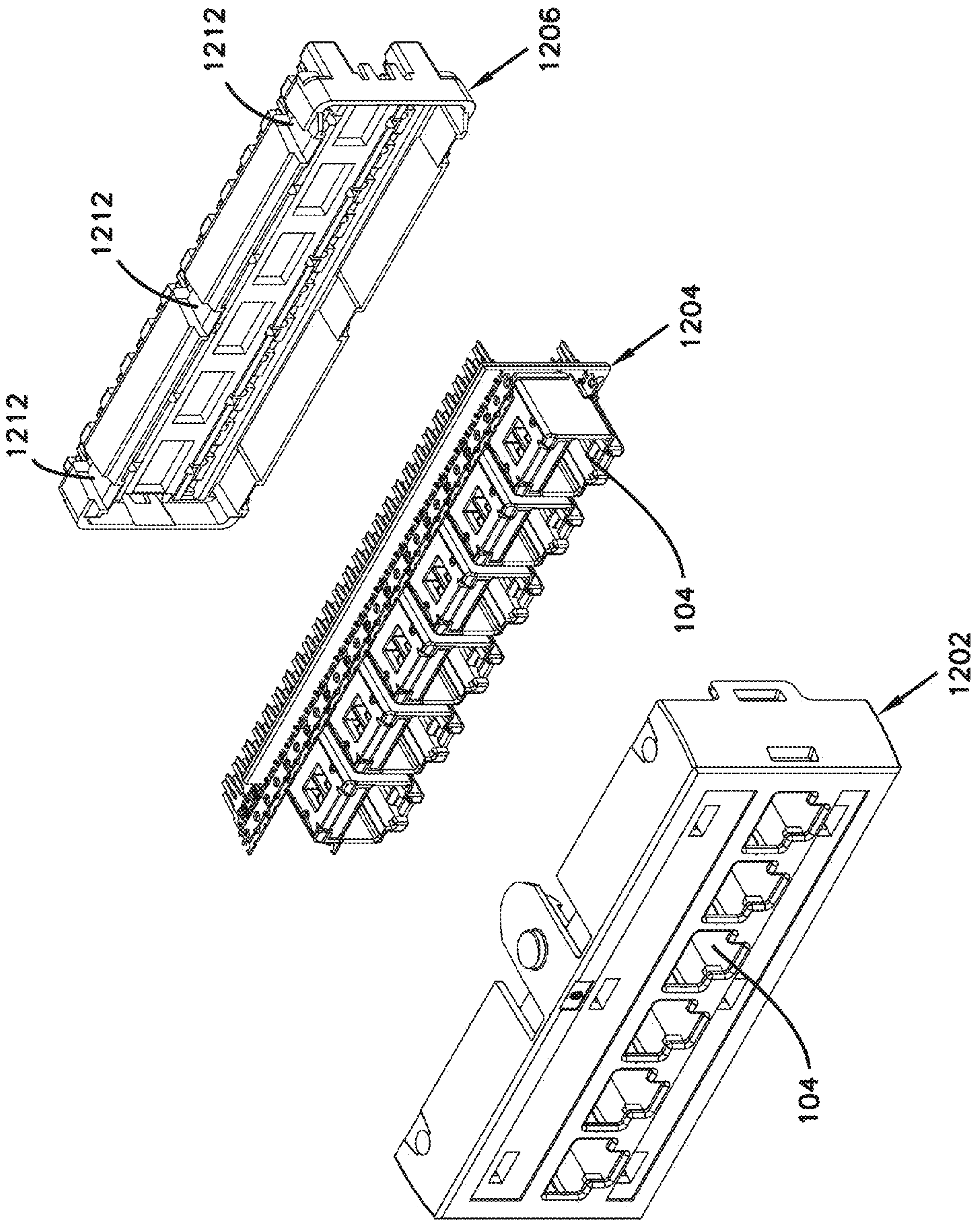
FIG. 13 illustrate another exploded view of a connector module.

FIG. 13 illustrates an exploded view of the connector module 110. The connector module includes a first piece 1202, a second piece 1204, and third piece 1206. The first piece 1202 is the front facing portion of the connector module 110 that includes, in an example, connector jacks 104. The third piece 1206 includes a plurality of connection receptacles 1212 that are configured to communicate with the connecting mechanisms of the first piece 1202. As described above, the second piece 1204 is maintained in position between the first piece 1202 and the third piece 1206. The connection between the first piece 1202 and the third piece 1206 may be a removable connection, or may be a fixed connection.

In the embodiment shown, the second piece 1204 includes a plurality of connection jacks 104 that made with the connection jacks 104 of the first piece 1202.

Embodiments of the present invention, for example, are described above with reference to block diagrams and/or operational illustrations of methods and systems according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A telecommunications patch panel comprising:

a connector module having a front face and an opposite facing rear face, the front face of the connector module including a connector jack for receiving a plug of a first conductive wire, the rear face including a connection location for connecting to a second conductive wire, the connector module defining an axis of rotation generally parallel to the front face; and a frame member having a front face, a rear face, and a plurality of tabs on the rear face, the connector module rotatably mounted to the frame member for movement about a rotation axis, and wherein the plurality of tabs engage with the rear face of the connector module to prevent over-rotation of the connector module.

2. The telecommunications patch panel of claim 1, wherein the connector module comprises a first latch arm on a top surface at the axis of rotation and a second latch arm on a bottom surface at the axis of rotation, wherein the first latch arm and the second latch arm each engage with a mating hole in the frame member.

3. The telecommunications patch panel of claim 1, wherein the front face of the connector module is positionable in one of three selectable positions, a first position where the front face of the connector module is generally parallel to the front face of the frame member, a first angled position where the front face of the connector module is at a first angle relative to the front face of the frame, and a second angled position where the front face of the connector module is at a second angle relative to the front face of the frame, the first angled position being in a first direction from the parallel position, the second angled position being in a second direction from the parallel position, the second direction being opposite the first direction.

4. The telecommunications patch panel of claim 3, wherein the connector module further comprises a plurality of protrusions extending from a top surface and/or a plurality of protrusions extending from a bottom surface, wherein the plurality of protrusions maintain the connector module in one of the three selectable positions.

5. The telecommunications patch panel of claim 4, wherein the plurality of protrusions engage with the frame member.

6. The telecommunications patch panel of claim 1, further comprising a locking cam for selectively locking the connector module to the frame member in one of the three selectable positions.

7. The telecommunications patch panel of claim 1 comprising a plurality of connector modules.

8. The telecommunications patch panel of claim 7, wherein the front face of each of the connector modules is positionable in one of three selectable positions, a first position where the front face of the connector module is generally parallel to the front face of the frame member, a first angled position where the front face of the connector module is at a first angle relative to the front face of the frame, and a second angled position where the front face of the connector module is at a second angle relative to the front face of the frame, the first angled position being in a first direction from the parallel position, the second angled position being in a second direction from the parallel position, the second direction being opposite the first direction, and wherein the connector modules are independently movable in one of the three selectable positions.

9. The telecommunications patch panel of claim 1, wherein the connector module is removable from the frame member.

10. A telecommunications patch panel comprising:

a plurality of connector modules, each connector module having a front face and an opposing rear base, each front face including a plurality of connection jacks defining at least one linear array, each rear face including a plurality of cable connection locations for transmission of telecommunications signals therebetween, each connector module defining an axis of rotation generally parallel to the front face; and a frame member having a front face, a rear face, and a plurality of tabs on the rear face, and a linear array of openings, each of the connector modules mounted to the frame member and one of the openings for rotatable movement about the respective rotation axis, and wherein the plurality of tabs engage with the rear face of the each of the plurality of connector modules to prevent over-rotation of the connector modules.

11. The telecommunications patch panel of claim 10, wherein each of the connector modules comprises a first latch arm on a top surface at the axis of rotation and a second latch arm on a bottom surface at the axis of rotation, wherein the first latch arm and the second latch arm each engage with a mating hole in the frame member.

12. The telecommunications patch panel of claim 10, wherein the front face of each of the connector modules is positionable in one of three selectable positions, a first position where the front face of the connector module is generally parallel to the front face of the frame member, a first angled position where the front face of the connector module is at a first angle relative to the front face of the frame, and a second angled position where the front face of the connector module is at a second angle relative to the front face of the frame, the first angled position being in a first direction from the parallel position, the second angled position being in a second direction from the parallel position, the second direction being opposite the first direction.

13. The telecommunications patch panel of claim 12, wherein each of the connector modules further comprises a plurality of protrusions extending from a top surface and/or a plurality of protrusions extending from a bottom surface, wherein the plurality of protrusions maintain the connector modules in one of the three selectable positions.

14. The telecommunications patch panel of claim 13, wherein the plurality of protrusions engage with the frame member.

15. The telecommunications patch panel of claim 10, further comprising a locking cam for selectively locking each of the connector modules to the frame member in one of the three selectable positions.

16. The telecommunications patch panel of claim 12, wherein each of the connector modules are independently movable in one of the three selectable positions.

17. The telecommunications patch panel of claim 10, wherein each of the connector modules are removable from the frame member.

18. A telecommunications patch panel comprising:

a connector module having a front face and an opposite facing rear face, the front face of the connector module including a connector jack for receiving a plug of a first conductive wire, the rear face including a connection location for connecting to a second conductive wire, the connector module having a latch arm on a top surface, the top surface being discontinuous on both sides of the latch arm, the latch arm defining an axis of rotation generally parallel to the front face; and a frame member having a front face, a rear face, and a mating hole on a top surface, the latch arm of the connector module rotatably mounted to the frame member at the mating hole for movement about a rotation axis.

19. The telecommunications patch panel of claim 18, wherein the connector module further comprises a second latch arm on a bottom surface, the second latch arm of the connector module rotatably mounted to the frame member at a mating hole on the bottom surface for movement about the rotation axis.

20. The telecommunications patch panel of claim 18, wherein the front face of the connector module is positionable in one of three selectable positions, a first position where the front face of the connector module is generally parallel to the front face of the frame member, a first angled position where the front face of the connector module is at a first angle relative to the front face of the frame, and a second angled position where the front face of the connector module is at a second angle relative to the front face of the frame, the first angled position being in a first direction from the parallel position, the second angled position being in a second direction from the parallel position, the second direction being opposite the first direction.

21. The telecommunications patch panel of claim 20, wherein the connector module further comprises a plurality of protrusions extending from a top surface and/or a plurality of protrusions extending from a bottom surface, wherein the plurality of protrusions maintain the connector module in one of the three selectable positions.

22. The telecommunications patch panel of claim 21, wherein the plurality of protrusions engage with the frame member.

23. The telecommunications patch panel of claim 18, further comprising a locking cam for selectively locking the connector module to the frame member in one of the three selectable positions.

24. The telecommunications patch panel of claim 18, wherein a connection of the latch arm to the mating hole is a removable connection.

25. The telecommunications patch panel of claim 18, comprising a plurality of the connector modules mounted to the frame member.

26. The telecommunications patch panel of claim 25, wherein each connector module has a front face and an opposing rear base, each front face including a plurality of connection jacks defining at least one linear array, each rear face including a plurality of cable connection locations for transmission of telecommunications signals therebetween.

27. The telecommunications patch panel of claim 26, wherein the front face of each connector module is positionable in one of three selectable positions, a first position where the front face of the connector module is generally parallel to the front face of the frame member, a first angled position where the front face of the connector module is at a first angle relative to the front face of the frame, and a second angled position where the front face of the connector module is at a second angle relative to the front face of the frame, the first angled position being in a first direction from the parallel position, the second angled position being in a second direction from the parallel position, the second direction being opposite the first direction.

28. The telecommunications patch panel of claim 27, wherein the connector module further comprises a plurality of protrusions extending from a top surface and/or a plurality of protrusions extending from a bottom surface, wherein the plurality of protrusions maintain the connector module in one of the three selectable positions.

29. The telecommunications patch panel of claim 28, further comprising a locking cam for selectively locking each connector module to the frame member in one of the three selectable positions.

* * * * *